(12) United States Patent
Kim (10) Patent No.: US 7,790,062 B2
(45) Date of Patent: Sep. 7, 2010

(54) COMPOSITION FOR ELECTRON EMISSION SOURCE, ELECTRON EMISSION SOURCE FORMED FROM THE COMPOSITION AND ELECTRON EMISSION DEVICE INCLUDING THE ELECTRON EMISSION SOURCE

(75) Inventor: Joo-Young Kim, Suwon-si (KR)

(73) Assignee: Samsung SDI Co., Ltd., Suwon-si (JP)

( * ) Notice: Subject to any disclaimer, the term of this patent is extended or adjusted under 35 U.S.C. 154(b) by 517 days.

(21) Appl. No.: 11/734,385

(22) Filed: Apr. 12, 2007

(65) Prior Publication Data

US 2007/0252505 A1 Nov. 1, 2007

(30) Foreign Application Priority Data

Apr. 26, 2006 (KR) ...................... 10-2006-0037709

(51) Int. Cl.
*H01J 19/06* (2006.01)
(52) U.S. Cl. .................. 252/511; 252/502; 252/510; 313/306; 313/310; 313/311
(58) Field of Classification Search ......... 313/300–311; 252/502, 510, 511
See application file for complete search history.

(56) References Cited

U.S. PATENT DOCUMENTS

| 5,219,945 | A | * | 6/1993 | Dicker et al. ................. 525/276 |
| 6,436,221 | B1 | | 8/2002 | Chang et al. |

(Continued)

FOREIGN PATENT DOCUMENTS

| EP | 1 020 888 | 7/2000 |

(Continued)

OTHER PUBLICATIONS

Search Report issued on Aug. 2, 2007 by the European Patent Office for European Patent Application No. 07106813.4.

*Primary Examiner*—David Wu
*Assistant Examiner*—Vu A Nguyen
(74) *Attorney, Agent, or Firm*—Stein McEwen, LLP (57) ABSTRACT

A composition for forming an electron emission source includes a polymer comprising a carbon-based material; a vehicle; and a unit of formula (1) below:

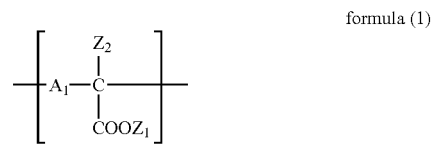

formula (1)

wherein $A_1$ is a single bond, or a substituted or unsubstituted $C_1$-$C_{20}$ alkylene group; and $Z_1$ and $Z_2$ are each hydrogen, a substituted or unsubstituted $C_1$-$C_{20}$ alkyl group, a substituted or unsubstituted $C_1$-$C_{20}$ alkoxy group, a carboxyl group, an —$NR_1R_2$ group, a part of a styrene group resin, or a part of a novolac resin, and $R_1$ and $R_2$ are each hydrogen, a substituted or unsubstituted $C_1$-$C_{20}$ alkyl group, or a substituted or unsubstituted $C_6$-$C_{30}$ aryl group. An electron emission source may be formed from the composition for forming an electron emission source, and an electron emission device and an electron emission display device may include the electron emission source. When the composition is used to form an electron emission source, the printability of the composition is improved and thus repeated printings can be carried out. Also, the developing properties are improved, so that an electron emission device having fine patterns can be obtained.

18 Claims, 4 Drawing Sheets

U.S. PATENT DOCUMENTS

| | | |
|---|---|---|
| 2004/0066132 A1 | 4/2004 | Cho et al. |
| 2004/0157140 A1* | 8/2004 | Kamata et al. ............ 430/7 |
| 2004/0170925 A1 | 9/2004 | Roach et al. |
| 2004/0263044 A1 | 12/2004 | Yoon et al. |
| 2005/0136787 A1 | 6/2005 | Lee et al. |
| 2005/0244325 A1 | 11/2005 | Nam et al. |
| 2006/0043864 A1 | 3/2006 | Cho et al. |

FOREIGN PATENT DOCUMENTS

| | | |
|---|---|---|
| WO | WO 02/03413 | 1/2002 |

* cited by examiner

COMPOSITION FOR ELECTRON EMISSION SOURCE, ELECTRON EMISSION SOURCE FORMED FROM THE COMPOSITION AND ELECTRON EMISSION DEVICE INCLUDING THE ELECTRON EMISSION SOURCE

CROSS-REFERENCE TO RELATED APPLICATIONS

This application claims the benefit of Korean Patent Application No. 2006-37709, filed on Apr. 26, 2006, in the Korean Intellectual Property Office, the disclosure of which is incorporated herein in its entirety by reference.

BACKGROUND OF THE INVENTION

1. Field of the Invention

Aspects of the present invention relate to a composition for forming an electron emission source, an electron emission source formed from the composition and an electron emission device including the electron emission source. More particularly, aspects of the present invention relates to a composition for forming an electron emission source, which composition includes a polymer having a terminal group and/or main chain by which adhesion with a substrate, developing properties, photosensitivity, printability, current density, etc., can be increased. Aspects of the present invention further relate to an electron emission source formed from the composition and an electron emission device including the electron emission source. An electron emission source that has fine micro patterns and an excellent current density can be obtained using the composition for forming an electron emission source.

2. Description of the Related Art

Generally, electron emission devices use a hot cathode or a cold cathode as an electron emission source. Examples of electron emission devices using a cold cathode include a field emitter array (FEA) type, a surface conduction emitter (SCE) type, a metal insulator metal (MIM) type, a metal insulator semiconductor (MIS) type, and a ballistic electron surface emitting (BSE) type.

The FEA type of electron emission device utilizes the principle that when a material with a low work function or a high β-function is used as an electron emission source, electrons are easily emitted in a vacuum due to an electric field difference. FEA devices that include a tip structure primarily composed of Mo, Si, etc. and having a sharp end, and carbon-based materials such as graphite, diamond like carbon (DLC), etc., as electron emission sources have been developed. Recently, nanomaterials such as nanotubes and nanowires have been used as electron emission sources.

The SCE type of electron emission device is formed by interposing a conductive thin film between a first electrode and a second electrode, which are arranged on a substrate so as to face each other, and producing microcracks in the conductive thin film. When voltages are applied to the first and second electrodes and an electric current flows along the surface of the conductive thin film, electrons are emitted from the microcracks constituting the electron emission source.

The MIM type and the MIS type of electron emission device include a metal-insulator-metal structure and a metal-insulator-semiconductor structure, respectively, as an electron emission source. When voltages are applied to the two metals in the MIM type or to the metal and the semiconductor in the MIS type, electrons are emitted while migrating and accelerating from the metal or the semiconductor having a high electron potential to the metal having a low electron potential.

The BSE type of electron emission device utilizes the principle that when the size of a semiconductor is reduced to less than the mean free path of electrons in the semiconductor, electrons travel without scattering. An electron-supplying layer composed of a metal or a semiconductor is formed on an ohmic electrode, and then an insulator layer and a metal thin film are formed on the electron-supplying layer. When voltages are applied to the ohmic electrode and the metal thin film, electrons are emitted.

FEA type electron emission devices can be categorized as top gate types and under gate types according to the arrangement of the cathode and gate electrode and can be categorized as diodes, triodes, tetrodes, etc., according to the number of electrodes used.

Electron emission sources in the electron emission devices described above can be composed of carbon-based materials, such as, for example, carbon nanotubes. Carbon nanotubes have excellent conductivity and electric field focusing effects, small work functions, and excellent electric field emission characteristics, and thus can function at a low driving voltage and can be used for large displays. For these reasons, carbon nanotubes are considered as an ideal electron emission material for electron emission sources.

Methods of forming electron emission sources containing carbon nanotubes include, for example, a carbon nanotube growing method using chemical vapor deposition (CVD), etc., and a paste method using a composition that contains carbon nanotubes and a vehicle. When using the paste method, manufacturing costs decrease, and large-area electron emission sources can be obtained. Examples of a composition for forming electron emission sources that contains carbon nanotubes are disclosed, for example, in U.S. Pat. No. 6,436,221.

However, when an electron emission source is formed using a conventional paste method, the printability of the composition for forming the electron emission source is bad, and repeated printings are difficult. In addition, when the electron emission source is patterned after printing by creating cured and uncured parts of a conventional composition for forming an electron emission source and then removing the uncured part, it may be difficult to remove the uncured part because of poor solubility in the developer and poor developing properties. Moreover, the adhesion between the cured part and the substrate may be poor and thus, the cured part may also be removed.

SUMMARY OF THE INVENTION

Aspects of the present invention provide a composition for forming an electron emission source, by which an electron emission source having high current density and more fine micro patterns, can be formed, an electron emission device formed from the composition, and an electron emission device including the electron emission source.

According to an aspect of the present invention, there is provided a composition for forming an electron emission source including carbon-based material; a vehicle; and a polymer comprising a unit of formula (1) below;

formula (1)

where A1 is a single bond, or a substituted or unsubstituted C1-C20 alkylene group; and $Z_1$ and $Z_2$ are each independently hydrogen, a substituted or unsubstituted C1-C20 alkyl group, a substituted or unsubstituted C1-C20 alkoxy group, a carboxyl group, an —$NR_1R_2$ group, a part of a styrene group resin, or a part of a novolac resin, and $R_1$ and $R_2$ are each independently hydrogen, a substituted or unsubstituted C1-C20 alkyl group, or a substituted or unsubstituted C6-C30 aryl group.

According to another aspect of the present invention, there is provided an electron emission source formed from the composition for forming an electron emission source as described above.

According to another aspect of the present invention, there is provided a method of making an electron emission source using the composition for forming an electron emission source as described above.

According to another aspect of the present invention, there is provided an electron emission device including the electron emission source formed from the composition for forming an electron emission source as described above.

According to another aspect of the present invention, there is provided an electron emission display device including the electron emission source formed from the composition for forming an electron emission source as described above.

A composition for forming an electron emission source according to aspects of the present invention includes a polymer having a terminal group and/or a main chain, by which adhesion with a substrate, developing properties, photosensitivity, printability, current density, etc. can be increased, in addition to carbon-based material and a vehicle. Thus, printability, photosensitivity and developing properties can be improved. Accordingly, an electron emission source having finer patterns can be obtained.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A composition for forming an electron emission source according to an embodiment of the present invention includes carbon-based material that has good conductivity and electron emission characteristics, and that emits electrons to a phosphor layer to excite phosphors when an electron emission device is working. Examples of the carbon-based material include carbon nanotubes, graphite, diamond, fullerene, silicon carbide (SiC), etc., but are not limited thereto. As a specific, non-limiting example, the carbon-based material may be carbon nanotubes.

Carbon nanotubes are carbon allotropes prepared by rolling graphite sheets to form tubes with nanometer-sized diameters. Both single-wall nanotubes and multi-wall nanotubes can be used. The carbon nanotubes can be prepared using chemical vapor deposition (hereinafter, also called "CVD"), such as DC plasma CVD, RF plasma CVD, or microwave plasma CVD.

In addition, the composition for forming an electron emission source according to the current embodiment of the present invention includes a vehicle. The vehicle included in the composition for forming electron emission sources adjusts the printability and viscosity of the composition and carries the carbon-based material and a photoelectric element. The vehicle may include a resin component and a solvent component.

The resin component may include, but is not limited to, at least one of a plurality of cellulose-based resins, such as ethyl cellulose, nitro cellulose, etc., acryl-based resins, such as polyester acrylate, epoxy acrylate, urethane acrylate, etc., and vinyl-based resins, such as polyvinyl acetate, polyvinyl butyral, polyvinyl ether, etc. Some of the above-listed resin components also can act as photosensitive resins.

The solvent component may include at least one of, for example, terpineol, butyl carbitol (BC), butyl carbitol acetate (BCA), toluene, and texanol. As a specific non-limiting example, the solvent component includes terpineol.

The amount of the resin component may be 100-500 parts by weight, or as a more particular, non-limiting example, may be 200-300 parts by weight, based on 100 parts by weight of the carbon-based material. The amount of the solvent component may be 500-1500 parts by weight, or as a more particular, non-limiting example, may be 800-1200 parts by weight, based on 100 parts by weight of the carbon-based material. When the amounts of the resin component and the solvent component do not lie within the above-described ranges, the printability and the flowability of the composition may be worsened. In particular, when the amounts of the resin component and the solvent component exceed the above-described ranges, the drying time may be too long.

The composition for forming an electron emission source according to the current embodiment of the present invention includes a polymer having a unit of formula (1) below:

formula (1)

In the above formula (1), $A_1$ is a single bond, or a substituted or unsubstituted $C_1$-$C_{20}$ alkylene group. As a specific, non-limiting example, A1 may be a substituted or unsubstituted $C_1$-$C_{10}$ alkylene group.

In the above formula (1), $Z_1$ and $Z_2$ are each independently hydrogen, a substituted or unsubstituted $C_1$-$C_{20}$ alkyl group, a substituted or unsubstituted $C_1$-$C_{20}$ alkoxy group, a carboxyl group, an —$NR_1R_2$ group, a part of a styrene group resin, or a part of a novolac resin. $R_1$ and $R_2$ are each independently hydrogen, a substituted or unsubstituted $C_1$-$C_{20}$ alkyl group, or a substituted or unsubstituted $C_6$-$C_{30}$ aryl group.

The polymer having a unit of formula (1) includes a plurality of units of formula (1), wherein the weight average molecular weight of the polymer is as described later. With respect to the plurality of units of formula (1), of the selection of $A_1$, $Z_1$ and $Z_2$ the same in all units or may vary. In other words, the polymer may be a homopolymer made up of repeating units of formula (1) having the same substitutions of $A_1$, $Z_1$ and $Z_2$ or can be a copolymer in which different units of formula (1) have different substitutions of $A_1$, $Z_1$ and $Z_2$. If the polymer having a unit of formula (1) is a copolymer, it may be any type of copolymer such as, for example, block, random, alternating, etc. At least one of $Z_1$ and $Z_2$ should be a carboxyl group, an —$NR_1R_2$, a part of a styrene group resin or a part of a novolac resin.

When at least one of $Z_1$ and $Z_2$ of the unit of formula (1) of the polymer is a carboxyl group, an —$NR_1R_2$ group, a part of a styrene group resin or a part of a novolac resin, the printability of the composition for forming an electron emission source is improved, such that repeated printings can be carried out. A carboxyl group, an —$NR_1R_2$ group, a part of styrene group resin or a part of novolac resin may also be a terminal group of the polymer. Also, the carboxyl group, the —$NR_1R_2$ group, the part of styrene group resin or the part of novolac resin provide enhanced photosensitivity that increases the contrast between the unexposed part and the exposed part in an exposing operation for forming the electron emission source and increase the adhesion between the carbon-based material and the substrate in a developing operation for forming the electron emission source and in an activating operation for vertical alignment of the carbon-based material. In addition, the carboxyl group, the —$NR_1R_2$ group, the part of a styrene group resin or the part of a novolac resin increases solubility of the composition for forming the electron emission source in various alkali solvents and increase the developing properties for forming the electron emission source. Thereby, an electron emission source having more precise micro patterns can be formed.

As used herein, the term "part of a styrene group resin", in the definition of $Z_1$ and $Z_2$, refers to a part or portion of a styrene group resin as that term would generally be understood by those of ordinary skill in the art in the context of a polymer having the unit of formula (1). In particular, the part of a styrene group resin is a monovalent group that provides a termination at $Z_1$ and $Z_2$. The part of a styrene group resin can also be an end terminal group of the polymer having the unit of formula (1). It is to be understood that the term refers not only to resins made from styrene per se, but also more generally to polymer resins having an alkyl group backbone substituted by an aryl group. An example of a part of a styrene group resin is a $C_1$-$C_{20}$ alkyl group substituted by at least one $C_6$-$C_{30}$ aryl group. In particular, the part of styrene group may be a group indicated as but is not limited thereto. The term "part of a novolac resin", in the definition $Z_1$ and $Z_2$, is a part of a novolac resin as that term would be generally understood by those of ordinary skill in the art in the context of a polymer having a unit of formula (1). In particular, the part of a novolac resin is a monovalent group that provides a termination at $Z_1$ or $Z_2$. The part of a novolac resin can also be an end terminal group of the polymer having the unit formula (1). The novolac resin is generally a resin that can be obtained using a method in which phenolics and aldehydes are reacted under existence of acid catalyst, and which includes an alkylene group, for example, a methylene group as a linking group. The novolac resin can be easily selected from any commercial novolac resin on the market. For example, the novolac resin may be a group indicated as -($Q_1$-$Q_2$)$_n$-$Q_3$, wherein $Q_1$ is a substituted or unsubstituted $C_6$-$C_{30}$ arylene group, $Q_2$ is a substituted or unsubstituted $C_1$-$C_{20}$ alkylene group and $Q_3$ is a $C_1$-$C_{20}$ alkyl group substituted by at least one hydroxy group, and n is an integer from 1 to 300. In particular, a part of the novolac resin may be a group indicated as but is not limited thereto. The weight average molecular weight of the polymer including a unit of formula (1) may be 10,000, or as a more particular, non-limiting example, may be 30,000. When the weight average molecular weight of the polymer including a unit of formula (1) is less than 10,000, cross-linking upon exposure is not sufficient, and thus patterns of the electron emission source cannot be formed effectively. When the weight average molecular weight of the polymer including the unit of formula (1) is greater than 100,000, flowing and viscosity properties of the composition for forming an electron emission source are degraded, and so the composition can not be easily applied on an upper surface of the substrate.

The polymer including a unit of formula (1) may be a copolymer that further includes at least one of a unit of formula (2) below and a unit of formula (3) below:

formula (2)

formula (3)

In the above formulas, $A_2$ and $A_4$ are single bonds, or a substituted or unsubstituted $C_1$-$C_{20}$ alkylene group. For example, $A_2$ and $A_4$ may be a $C_1$-$C_{10}$ alkylene group.

In the above formulas, $Z_3$ may be a substituted or unsubstituted $C_6$-$C_{30}$ aryl group.

In the above formulas, $A_3$ may be a substituted or unsubstituted $C_6$-$C_{30}$ arylene group.

The units of formulas (2) and (3) may be viewed as divalent units of a styrene group resin or a novolac resin respectively so that the units of at least one of formulas (2) and (3) may be included in the backbone of the polymer having a unit of formula (1). That is, the polymer, which is included in a composition for forming an electron emission source according to the current embodiment of the present invention in addition to the carbon-based material and the vehicle, may include a part of styrene group resin and/or a part of novolac resin as a terminal group and/or as part of the main polymer chain. These are easily understood by those of ordinary skill in the art who can understand the meaning of formulas (1), (2) and (3), a styrene group resin and novolac resin.

Throughout this specification, in the above formulas (1), (2) and (3), an alkyl group, an aryl group, an alkylene group or an arylene group may be unsubstituted or substituted. Non-limiting examples of a substituent group include a hydroxyl group, a cyano group, an amino group, a carboxyl group and a $C_1$-$C_{20}$ alkyl group, etc.

When a polymer according to an embodiment of the present invention further includes at least one of a unit of formula (2) and a unit of formula (3), the molar ratio of a unit of formula (1) to a unit of formula (2) may be 1:0.5-1:1, and a molar ratio of a unit of formula (1) to a unit of formula (3) may be 1:0.5-1:1. When the molar ratio is outside the molar ratio range as described above such that there are many units of formula (1) in comparison to the number of units of formula (2) or (3), the printability, developing properties and adhesion of the composition may not be improved sufficiently. When the molar ratio is outside the molar ratio as described above such that there relatively fewer units of formula (1), the photosensitivity of the composition may be degraded.

In particular, a polymer having a unit of formula (1) may further include a unit of formula (2a) below and/or a unit of formula (3a) below, but is not limited thereto;

formula (2a)

formula (3a)

The amount of a polymer having a unit of formula (1) in the composition for forming an electron emission source may be 1,500-5,000 parts by weight based on 100 parts by weight of carbon-based material, and or as a more particular, non-limiting example, may be 3,000-4,000 parts by weight. When the amount of polymer having a unit of formula (1) is less than 1500 parts by weight based on 100 parts by weight of carbon-based material, the adhesion of the composition may be poor and thus, patterns of the electron emission source may not be formed effectively. When the amount of polymer having a unit of formula (1) is greater than 4000 parts by weight based on 100 parts by weight of carbon-based material, the flowing and viscosity properties of the composition may be degraded, and thus, it may not be possible to apply the composition to an upper surface of a substrate effectively.

The composition for forming an electron emission source according to the current embodiment of the present invention may further include a photosensitive resin, a photoinitiator, an adhesive component, and a filler, etc.

A photosensitive resin may be used for patterning when forming an electron emission source. Non-limiting examples of the photosensitive resin include an acrylate-based monomer, a benzophenone-based monomer, an acetophenone-based monomer, a thioxanthone-based monomer, etc. In particular, polyester acrylate, methyl acrylate, ethylacrylate, n-propylacrylate, isopropylacrylate, n-butylacrylate, sec-butylacrylate, iso-butylacrylate, allylacrylate, benzylacrylate, butoxyethylacrylate, butoxytriethyleneglycolacrylate, glycerolacrylate, glycidylacrylate, 2-hydroxyethylacrylate, isobornylacrylate, 2-hydroxypropylacrylate, 2,4-diethylxanthone, or 2,2-dimethoxy-2-phenylacetophenone, etc., may be used.

The amount of the photosensitive resin may be 300-1,000 parts by weight, or as a more particular, non-limiting example, may be 500-800 parts by weight, based on 100 parts by weight of the carbon-based material. When the amount of the photosensitive resin is less than 300 parts by weight based on 100 parts by weight of the carbon-based material, the exposure sensitivity decreases. When the amount of the photosensitive resin is greater than 1,000 parts by weight based on 100 parts by weight of the carbon-based material, developing can not be performed effectively.

The composition for forming an electron emission source according to the current embodiment of the present invention may further include a photoinitiator. The photoinitiator initiates cross-linking of the photosensitive resin when exposed to light and may be a well-known material. Examples of the photoinitiator may include benzophenone, o-benzoyl benzoic acid methyl, 4,4-bis(dimethyl amine)benzophenone, 4,4-bis (diethylamino)benzophenone, 4,4-dichlorobenzophenone, 4-benzoyl-4-methyl diphenylketone, dibenzylketone, 2,2-diethoxyacetophenone, 2,2-dimethoxy-2-phenylacetophenone, 2-hydroxy-2-methyl propiophenone, thioxanthone, 2-methyl thioxanthone, 2-chlorothioxanthone, 2-isopropylthioxanthone, diethylthioxanthone, benzyldimethyl ketanol, or benzylmethoxyethylacetal, etc.

The amount of the photoinitiator may be 300-1,000 parts by weight, or as a more particular, non-limiting example, may be 500-800 parts weight, based on 100 parts by weight of the carbon-based material. When the amount of the photoinitiator is less than 300 parts by weight based on 100 parts by weight of the carbon-based material, cross-linking may not be effective to form patterns. When the amount of the photoinitiator is greater than 1,000 parts by weight based on 100 parts by weight of the carbon-based material, manufacturing costs rise.

The adhesive component adheres the composition to the substrate on which the electron emission source is to be formed. The adhesive component may be, for example, an inorganic binder, etc. Non-limiting examples of the inorganic binder include frit, silane, water glass, etc. A combination of at least two of these inorganic binders can be used. As a specific, non-limiting example, the inorganic binder may be a frit, such as a frit composed of PbO, ZnO, or $B_2O_3$.

The amount of the inorganic binder in the composition for forming an electron emission source may be 10-50 parts by weight, or as a more particular, non-limiting example, may be 15-35 parts by weight, based on 100 parts by weight of the carbon-based material. When the amount of the inorganic binder is less than 10 parts by weight based on 100 parts by weight of the carbon-based material, the adhesion may not be sufficiently strong. When the amount of the inorganic binder is greater than 50 parts by weight based on 100 parts by weight of the carbon-based material, the printability may be worsened.

The filler improves the conductivity of the carbon-based material wherever it is not strongly adhered to the substrate. Non-limiting examples of the filler include Ag, Al, Pd, etc.

The viscosity of the composition for forming electron emission sources according to the current embodiment of the present invention, which contains the above-described materials, may be 3,000 cps, or as a more particular, non-limiting example, may be 5,000 cps. When the viscosity of the composition does not meet the above range, the workability of the composition may be worsened.

When using the composition for forming an electron emission source according to the current embodiment of the present invention as described above, the printability, photosensitivity, developing properties and adhesion are improved, and an electron emission source having precise patterns can be obtained. An electron emission source according to an embodiment of the present invention can be obtained using a method including: preparing a composition for forming an electron emission source as described above; applying the composition for forming an electron emission source to a substrate; and heat treating the applied composition for forming an electron emission source on the substrate.

First, a composition for forming an electron emission source as described above is prepared.

Next, the composition for forming electron emission sources is applied to the substrate. The substrate on which electron emission sources may be formed may vary according to the type of electron emission device to be formed, as would be obvious to one of skill in the art. For example, when manufacturing an electron emission device with gate electrodes between a cathode and an anode, the substrate may be the cathode.

Applying the composition for forming an electron emission source to a substrate, includes, for example: forming photoresist patterns on the substrate using photolithography; coating the composition for forming an electron emission source; and exposing the resulting substrate to form a cured part and an uncured part of the composition for forming an electron emission source. Next, by removing the uncured part and the photoresist patterns, the composition for forming an electron emission source remains on the substrate as the cured part of the composition. Two-phase operations may be used in the removal of the uncured part and the photoresist patterns. As an example of a two-phase operation, the uncured part may be developed using an alkali developer such as tetra methyl ammonium hydroxide (TMAH), $Na_2CO_3$, $NaHCO_3$, $K_2CO_3$, $K_2HCO_3$, $(NH_4)_2CO_3$, $(NH_4)HCO_3$, etc., and the photoresist patterns may be removed using an organic solvent such as ketone, alcohol, for example, acetone, ethyl cellosolve, etc.

Since the composition for forming an electron emission source according to an embodiment of the present invention includes a polymer having a unit of formula (1) as described above, the composition can be easily coated on an upper surface of the substrate, for example, and repeated coatings can be created on the substrate. When the composition for forming an electron emission source is exposed to conform to an electron emission source formation region, the photosensitivity can be enhanced For example, the contrast between an exposed part and an unexposed part may be increased. In addition, after curing, the uncured portion of the composition for forming an electron emission source according to an embodiment of the present invention has an increased solubility in an alkali solvent. Thus, the developing properties can be enhanced, and the uncured part can be removed more easily.

The composition for forming electron emission sources applied to the substrate is heat treated as described above. Using heat treatment, the adhesion between the carbon-based material of the composition for forming electron emission sources and the substrate is increased. Vehicle components are volatilized, and inorganic materials such as binders, etc., are melted and solidified to enhance the durability of the electron emission source. The heat treatment temperature should be determined according to the volatilization temperature and volatilization time of the vehicle included in the composition for forming an electron emission source. For example, the heat treatment temperature typically may be 400-500° C., or as a more particular, non-limiting example, may be 450° C. When the heat treatment temperature is less than 400° C., the volatilization of the vehicle, etc. may not be sufficient. When the heat treatment temperature is greater than 500° C., manufacturing costs may increase and the substrate may be damaged.

The heat treatment may be performed in an inert gas environment in order to inhibit the degradation of carbon-based material. The inert gas may be, for example, nitrogen gas, argon gas, neon gas, xenon gas or a mixed gas of at least two of the aforementioned gases.

As described above, the electron emission source according to an embodiment of the present invention is cured and heat treated. Accordingly, silicon-based material included in the composition for forming the electron emission sources is transformed physically and chemically due to the curing and heat treatment. Thus, the cured and heat treated resultant material may be included in the electron emission source.

The surface of the heat treatment resultant material may be additionally processed to provide vertical alignment and surface exposure of the carbon-based material. According to an embodiment of the present invention, an electron emission source surface treatment material includes a solution that can be cured into a film using a heat treatment. such as, For example, the surface treatment material may be a polyimide group polymer. The surface treatment material is coated onto the heat treated resultant material and then heat treated. Then, the heat treated film is delaminated. According to anther embodiment of the present invention, an adhesive part is formed on the surface of a roller that drives with a predetermined driving source so that the surface of the heat treated resultant material is compressed by a predetermined pressure. Thus, an activating operation can be performed. Through this activating operation, the carbon-based material can be controlled so as to be exposed to the surface of the electron emission source or so as to be aligned vertically.

An electron emission device according to an embodiment of the present invention includes an electron emission source formed from a composition for forming an electron emission source as described above. More particularly, an electron emission device according to an embodiment of the present invention includes: a substrate; a plurality of cathodes arranged on the substrate; a plurality of gate electrodes arranged so as to intersect with the cathodes; an insulator layer arranged between the cathodes and the gate electrodes to insulate the cathodes and the gate electrodes; electron emission source holes arranged where the cathodes and the gate electrodes intersect; and electron emission sources arranged in the electron emission holes.

The electron emission device may further include a second insulator layer formed on an upper surface of the gate electrodes. In addition, various changes can be made. For example, the electron emission device may further include a source electrode that is insulated from the gate electrodes by the second insulator layer and that is arranged to be parallel with the gate electrode.

The electron emission device can be used in various electrical devices, such as, for example, backlights of liquid crystal displays (LCDs), etc., and electron emission display devices, etc.

Among these, a electron emission display device according to an embodiment of the present invention includes: a first substrate, a plurality of cathodes arranged on the first substrate; a plurality of gate electrodes arranged to intersect the cathodes; a insulator layer which is arranged between the cathodes and the gate electrodes to insulate the cathodes and the gate electrodes; electron emission source holes formed in the gate points at which the cathodes and the gate electrodes intersect; electron emission sources arranged in the electron emission source holes; and a second substrate arranged to be substantially parallel with the first substrate. The second substrate includes an anode and a phosphor layer.

Figure 1:
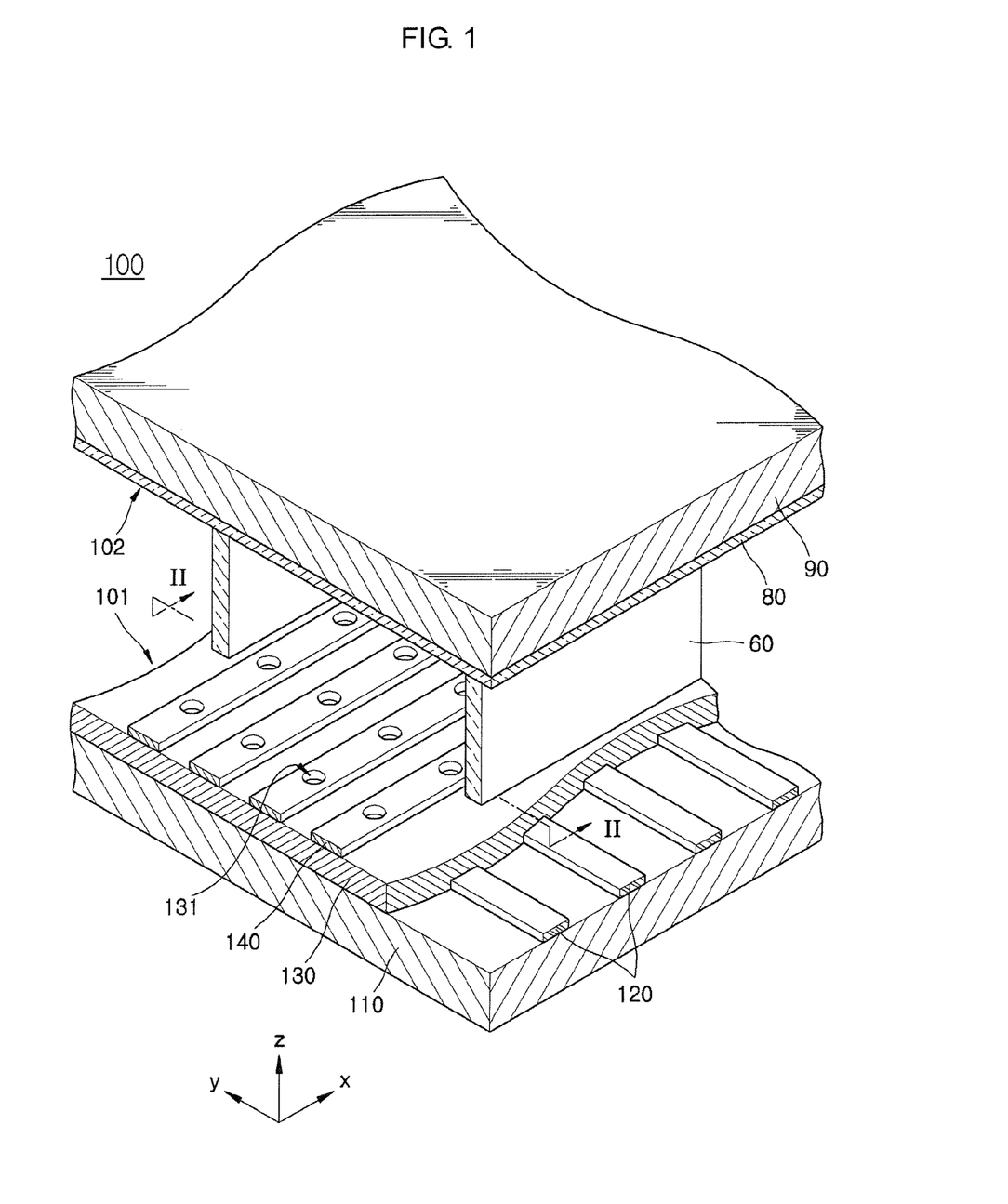
FIG. 1 is a schematic perspective view of a structure of a top gate type electron emission display device according to an embodiment of the present invention.
Figure 2:
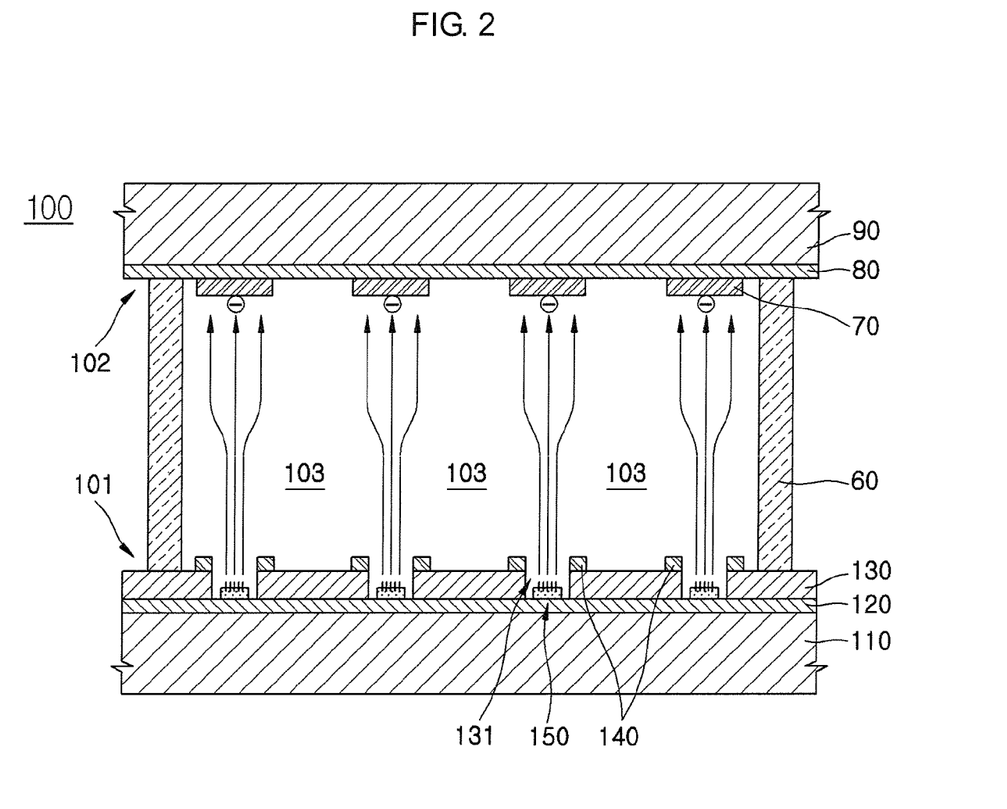
FIG. 2 is a cross-sectional view of the top gate type electron emission display device taken along a line II-II in FIG. 1.

FIG. 1 is a schematic perspective view of a top gate type electron emission display device 100 according to an embodiment of the present invention, and FIG. 2 is a cross-sectional view taken along a line II-II of FIG. 1.

Referring to FIGS. 1 and 2, the top gate type electron emission display device 100 includes an electron emission device 101 and front panel 102, which are arranged to be parallel with each other and form a vacuum light emission space 103, and a spacer 60, which is formed between the electron emission device 101 and the front panel 102 and maintains a predetermined distance between the electron emission device 101 and the front panel 102.

The electron emission device 101 includes a first substrate 110, a plurality of cathodes 120, a plurality of gate electrodes 140 arranged to intersect the cathodes 120, and an insulator layer 130 interposed between the gate electrodes 140 and the cathodes 120 to electrically insulate the gate electrodes 140 and the cathodes 120.

Electron emission source holes 131 are formed in regions in which the gate electrodes 140 and the cathodes 120 intersect. Electron emission sources 150 are included in the electron emission source holes 131.

The front panel 102 includes a second substrate 90, an anode 80 arranged on a lower surface of the second substrate 90, and a phosphor layer 70 arranged on a lower surface of the anode 80.

Although an embodiment of the present invention has been described with reference to the top gate type electron emission display device 100 illustrated in FIGS. 1 and 2, embodiments of the present invention can also include electron emission display devices with different structures such as, for example, an electron emission display device including an additional insulator layer and/or a focusing electrode.

Hereinafter, aspects of the present invention will be described in greater detail with reference to the following examples. The following examples are for illustrative purposes only and are not intended to limit the scope of the invention.

Preparation Example

First, 1 g of carbon nanotube powder (available from CNI), 0.2 g of glass frit (8,000 L, Shinheung Ceramics), 50 g of a polymer of product name NF650 (a copolymer comprising methylmethacrylate, methacrylic acid novolac resin based units and novolac resin based terminal groups) available from Miwon Commercial Co., Ltd. and having a weight average molecular weight of 30,000) and 5 g of benzophenone were added to 10 g of terpineol and stirred to prepare a composition for forming electron emission sources having a viscosity of 30,000 cps. Hereinafter, this was called composition "1".

Comparative Example

A composition for forming an electron emission source was formed using the same method as the Preparation Example except that methylmethacrylate-methacrylic acid copolymer (MMA-MAA) (having a weight average molecular weight of 35,000, available from Enbtech Inc. under the product name of EPRO26) was used instead of the polymer NF650. Hereinafter, this was called composition "A".

Evaluation Example 1

Evaluation of Printability of the Compositions 1 and A in Forming an Electron Emission Source With respect to compositions 1 and A, the printability thereof was estimated according to whether repeated coatings could be formed or not. The compositions 1 and A were coated repeatedly using a screen printer at ambient temperature and the coating surface was observed. The compositions 1 and A were coated until the coated surface was not flat and a composition on the coated surface could not separated using a knife. These results are shown in Table (1) below. Referring to Table (1), with respect to composition A of Comparative Example, repeated printings could only be carried out 2 times. However, with respect to composition 1 according to an embodiment of the present invention, repeated printings could be carried out more than 10 times.

TABLE 1

|  | composition 1 | composition A |
| --- | --- | --- |
| a number of times that repeated printings can be carried out | more 10 times | 2 times |

A substrate on which a Cr gate electrode, an insulator layer, and an ITO electrode were formed was prepared, and patterns of a photoresist were formed to conform to an electron emission source formation region. Composition 1 obtained from the above Preparation Example was coated on the substrate. Next, the substrate was exposed with exposing energy of 2000 mJ/cm$^2$ using an aligning exposer, and the uncured portion of the composition was removed using a TMAH solvent (0.1 wt %). The photoresist patterns were removed using ethyl cellosolve. Next, the substrate was heat treated at a temperature of 450° C. and in a nitrogen gas atmosphere to form an electron emission source.

Evaluation Example 2

Observation of Electron Emission Surface

Figure 3A:
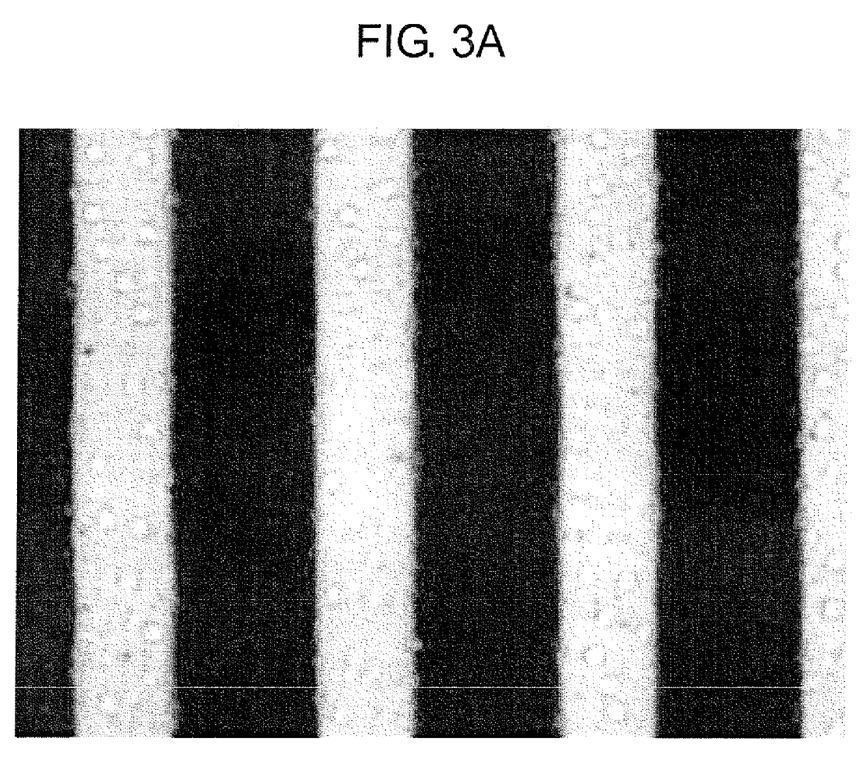
FIGS. 3A and 3B represent photographic images of electron emission sources observed by optical microscope according to embodiments of the present invention.
Figure 3B:
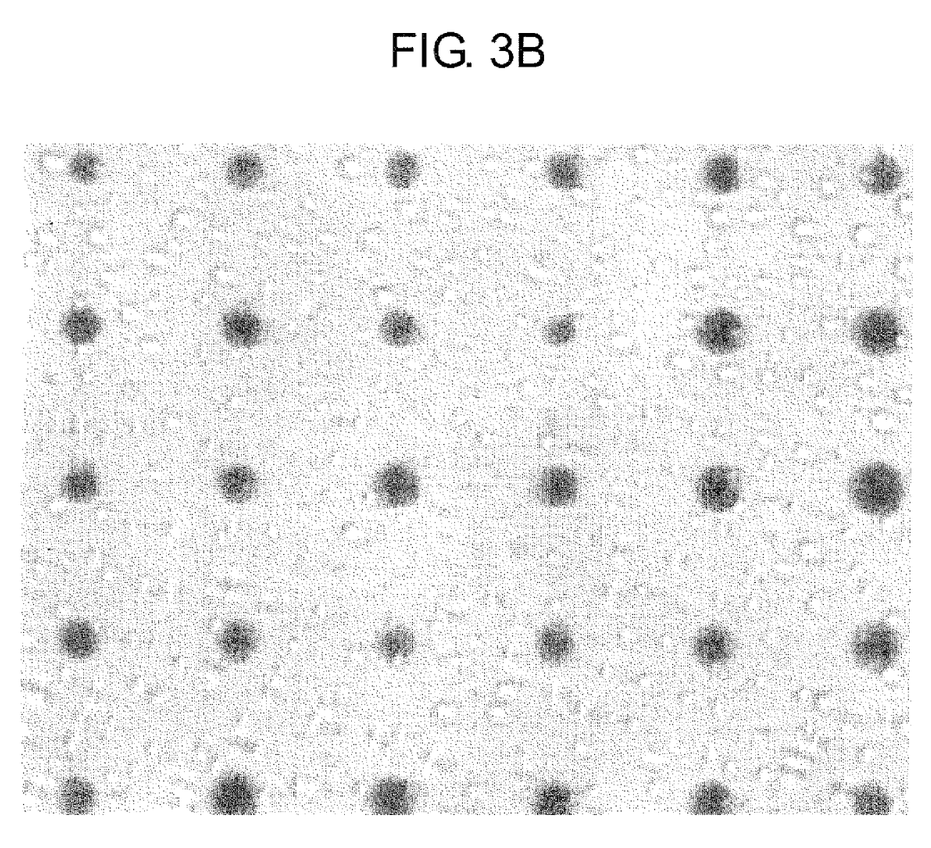

FIGS. 3A and 3B represent photographic images of electron emission sources observed by optical microscope according to embodiments of the present invention. Referring to FIGS. 3A and 3B, an electron emission source according to an embodiment of the present invention has excellent pattern resolution and sharpness.

A composition for forming an electron emission source according to an embodiment of the present invention includes a polymer having a unit of formula (1) in addition to a carbon-based material and a vehicle. Thus, the printability, photosensitivity, developing properties and film adhesion are improved. In particular, the process margin can be increased because of the improvement in the photosensitivity. Accordingly, an electron emission source formed from a composition for forming an electron emission source according to an embodiment of the present invention can have fine patterns.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A composition for forming an electron emission source comprising a carbon-based material; a vehicle; and a polymer comprising a unit of formula (1) below:

formula (1)

where $A_1$ is a single bond, or a substituted or unsubstituted $C_1$-$C_{20}$ alkylene group; and $Z_1$ and $Z_2$ are each independently hydrogen, a substituted or unsubstituted $C_1$-$C_{20}$ alkyl group, a substituted or unsubstituted $C_1$-$C_{20}$ alkoxy group, a carboxyl group, an —$NR_1R_2$ group, a part of a styrene group resin, or a part of a novolac resin, and wherein $R_1$ and $R_2$ are each independently hydrogen, a substituted or unsubstituted $C_1$-$C_{20}$ alkyl group, or a substituted or unsubstituted $C_6$-$C_{30}$ aryl group, and wherein at least one of $Z_1$ and $Z_2$ is a part of a novolac resin.

2. The composition of claim 1, wherein the part of a novolac resin is a group having the formula -$(Q_1$-$Q_2)_n$-$Q_3$, wherein $Q_1$ is a substituted or unsubstituted $C_6$-$C_{30}$ arylene group, $Q_2$ is a substituted or unsubstituted $C_1$-$C_{20}$ alkylene group, $Q_3$ is a $C_1$-$C_{20}$ alkyl group substituted by at least one hydroxy group, and n is an integer from 1 to 300.

3. The composition of claim 1, wherein
the part of a novolac resin is a group of the formula wherein n is an integer from 1 to 300.

4. The composition of claim 1, wherein the weight average molecular weight of the polymer comprising a unit of formula (1) is 10,000-100,000.

5. A composition for forming an electron emission source comprising a carbon-based material; a vehicle; and a polymer comprising a unit of formula (1) below:

formula (1)

where $A_1$ is a single bond, or a substituted or unsubstituted $C_1$-$C_{20}$ alkylene group; and

$Z_1$ and $Z_2$ are each independently hydrogen, a substituted or unsubstituted $C_1$-$C_{20}$ alkyl group, a substituted or unsubstituted $C_1$-$C_{20}$ alkoxy group, a carboxyl group, an —$NR_1R_2$ group, a part of a styrene group resin, or a part of a novolac resin, and wherein $R_1$ and $R_2$ are each independently hydrogen, a substituted or unsubstituted $C_1$-$C_{20}$ alkyl group, or a substituted or unsubstituted $C_6$-$C_{30}$ aryl group, wherein the polymer comprising a unit of formula (1) further comprises a unit of formula (3) below:

formula (3)

wherein $A_4$ is a single bond, or a substituted or unsubstituted $C_1$-$C_{20}$ alkylene group;
and
$A_3$ is a substituted or unsubstituted $C_6$-$C_{30}$ arylene group.

6. A composition for forming an electron emission source comprising a carbon-based material; a vehicle; and a polymer comprising a unit of formula (1) below:

formula (1)

where $A_1$ is a single bond, or a substituted or unsubstituted $C_1$-$C_{20}$ alkylene group; and $Z_1$ and $Z_2$ are each independently hydrogen, a substituted or unsubstituted $C_1$-$C_{20}$ alkyl group, a substituted or unsubstituted $C_1$-$C_{20}$ alkoxy group, a carboxyl group, an —$NR_1R_2$ group, a part of a styrene group resin, or a part of a novolac resin, and wherein $R_1$ and $R_2$ are each independently hydrogen, a substituted or unsubstituted $C_1$-$C_{20}$ alkyl group, or a substituted or unsubstituted $C_6$-$C_{30}$ aryl group, wherein the polymer comprising a unit of formula (1) further comprises a unit of formula (2) below:

formula (2)

wherein $A_2$ is a single bond, or a substituted or unsubstituted $C_1$-$C_{20}$ alkylene group;

$Z_3$ is a substituted or unsubstituted $C_6$-$C_{30}$ aryl group; and
wherein the molar ratio of a unit of formula (1) to a unit of formula (2) is 1:0.5-1:1 and wherein the carbon-based material comprises carbon nanotubes.

7. The composition of claim 5, wherein the molar ratio of a unit of formula (1) to a unit of formula (3) is 1:0.5-1:1.

8. The composition of claim 6, wherein the unit of formula (2) comprises a unit of formula (2a) below:

formula (2a)

9. The composition of claim 1, wherein the amount of the polymer comprising the unit of formula (1) is 1500-5000 parts by weight based on 100 parts by weight of the carbon-based material.

10. The composition of claim 1, wherein the composition has an improved printability, photosensitivity, developing properties and adhesion in comparison to a composition for forming an electron emission source that does not include the polymer having the unit of formula (1).

11. An electron emission source formed from a composition for forming an electron emission source comprising a carbon-based material; a vehicle; and a polymer comprising a unit of formula (1) below:

formula (1)

where $A_1$ is a single bond, or a substituted or unsubstituted $C_1$-$C_{20}$ alkylene group; and $Z_1$ and $Z_2$ are each independently hydrogen, a substituted or unsubstituted $C_1$-$C_{20}$ alkyl group, a substituted or unsubstituted alkoxy group, a carboxyl group, an —$NR_1R_2$ group, a part of a styrene group resin, or a part of a novolac resin, and wherein $R_1$ and $R_2$ are each independently hydrogen, a substituted or unsubstituted $C_1$-$C_{20}$ alkyl group, or a substituted or unsubstituted $C_6$-$C_{30}$ aryl group, and wherein at least one of $Z_1$ and $Z_2$ is a carboxyl group, an —$NR_1N_2$ group, a part of a styrene group resin, or a part of a novolac resin.

12. An electron emission device comprising the electron emission source of claim 11.

13. An electron emission device, comprising:
a substrate;
a plurality of cathodes arranged on the substrate;
a plurality of gate electrodes arranged so as to intersect the cathodes;
an insulator layer arranged between the cathodes and the gate electrodes to insulate the cathodes and the gate electrodes; and
electron emission source holes formed where the cathodes and the gate electrodes intersect; wherein each electron emission source hole contains the electron emission source of claim 11.

14. The electron emission device of claim 13, further comprising:
a second insulator layer covering an upper surface of the gate electrodes; and
a focusing electrode which is insulated from the gate electrodes by the second insulator layer and is arranged to be parallel with the gate electrode.

15. An electron emission display device, comprising:
a first substrate;
a plurality of cathodes arranged on the first substrate;
a plurality of gate electrodes arranged so as to intersect the cathodes;
an insulator layer arranged between the cathodes and the gate electrodes to insulate the cathodes and the gate electrodes;
electron emission source holes formed where the cathodes and the gate electrodes intersect; wherein each electron emission source hole contains the electron emission source of claim 11; and
a second substrate arranged to be substantially parallel with the first substrate and comprising an anode and a phosphor layer.

16. The composition of claim 5, wherein the unit of formula (3) comprises a unit of formula (3a) below:

formula (3a)

17. The composition of claim 1, wherein the carbon-based material comprises carbon nanotubes.

18. The composition of claim 5, wherein the carbon-based material comprises carbon nanotubes.

* * * * *

UNITED STATES PATENT AND TRADEMARK OFFICE
CERTIFICATE OF CORRECTION

PATENT NO. : 7,790,062 B2  
APPLICATION NO. : 11/734385  
DATED : September 7, 2010  
INVENTOR(S) : Joo-Young Kim Page 1 of 1

It is certified that error appears in the above-identified patent and that said Letters Patent is hereby corrected as shown below:

On the Title Page

(73) Assignee    Delete "Samsung SDI Co., Ltd., Suwon-si (JP)",

Insert --Samsung SDI Co., Ltd., Suwon-si (KR)--

In the Claims

Column 14, line 51,    After "1:0.5-1:1",  
Claim 6              Insert --,--

Column 15, line 27,   After "unsubstituted",  
Claim 11             Insert --$C_1$-$C_{20}$--

Column 15, line 34,   Delete "-$NR_1N_2$",  
Claim 11             Insert -- -$NR_1R_2$--

Signed and Sealed this  
Twenty-second Day of November, 2011

David J. Kappos  
*Director of the United States Patent and Trademark Office*